United States Patent [19]

Borggreen et al.

[11] 3,771,263
[45] Nov. 13, 1973

[54] METHOD FOR DISPOSAL OF REFUSE BY DEGASIFYING AND GASIFICATION THEREOF

[75] Inventors: Georg Borggreen, Kolding; Jorn Kragh, Hillerod; Erik Holm Laustsen, Kolding, all of Denmark

[73] Assignee: Georg Borggreen, Kolding, Denmark

[22] Filed: Feb. 22, 1971

[21] Appl. No.: 117,829

[30] Foreign Application Priority Data
Feb. 24, 1970 Denmark .............................. 884/70

[52] U.S. Cl. ..................................... 48/209, 48/111
[51] Int. Cl. ........... C10j 3/06, C10j 3/20, F23g 5/00
[58] Field of Search .................. 48/209, 111, 197 A, 48/197 R, 197 US, 64 US, 99 US, 85.1, 202, 206; 201/21, 2.5

[56] References Cited
UNITED STATES PATENTS
3,471,275  10/1969  Borggreen ............................ 48/209
R15,320    3/1922   McDonald ............................. 48/209
1,590,279  6/1926   Broome ............................ 48/85.1 X Primary Examiner—Joseph Scovronek
Attorney—Spencer & Kaye

[57] ABSTRACT

A method for disposal of refuse by degasifying and gasification thereof in a retort having gas exhaustion near its outlet end, and in which the refuse is heated to such a degree that within the retort a gasification zone is maintained with a temperature of not below 900°C, by which new method a substantial part of the heat required for heating the refuse within the retort is obtained by means of steam superheated to a temperature of above 900°C, preferably above 1200°C, which steam is introduced into the retort. Preferably the steam or a part thereof is conducted through the retort co-current with the refuse, but most conveniently a part of the superheated steam is introduced into the retort between the refuse inlet and the gasification zone. Also it is recommended that the refuse is preheated to a temperature of 500° to 700°C before being influenced by the superheated steam. In many cases it may be appropriate that also at least a part of the retort wall is directly heated. Most advantageously a retort of the type corresponding to a rotary kiln is used.

12 Claims, 1 Drawing Figure

PATENTED NOV 13 1973 3,771,263
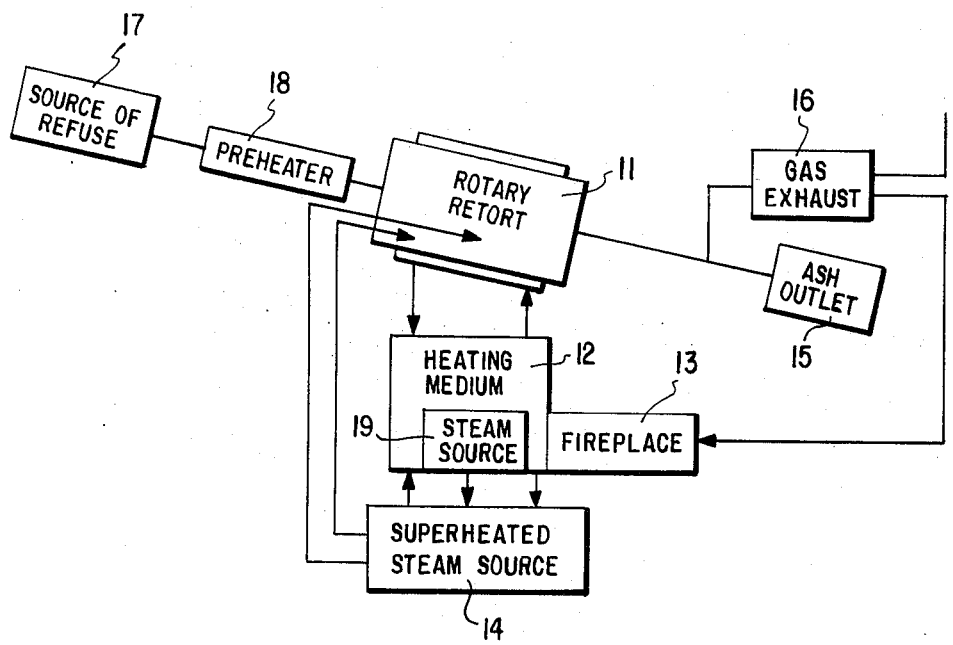

METHOD FOR DISPOSAL OF REFUSE BY DEGASIFYING AND GASIFICATION THEREOF

This invention relates to a method for disposal of refuse, including for instance rubbish, sewage sludge and low-value or waste fuels by degasifying and gasification thereof in a retort, in which the refuse is heated to such a degree that within a gasification zone a temperature of not below 900°C is maintained.

Disposal of refuse by degasifying and degasification has many advantages over other methods of refuse destruction, such as for instance over incineration of refuse in incinerators, thus especially a far smaller air contamination, as this is limited to an increase of the $CO_2$-content of the air, in any case if part of the gas produced is used for generation of the heat required for the destruction of the refuse in the retort. If, furthermore, the destruction in a retort is carried out through high-temperature gasification, i.e. in such a way that in the retort zone having maximum temperature a gasification temperature occurs resulting in an acceptable reaction velocity, i.e. a temperature of not below 900° centigrade, further those hardly useful substances, such as soot and tarry substances, which unavoidably result by low-temperature gasification or pyrolysis of the refuse, i.e. through gasification of this in an atmosphere free from or deficient in oxygen at temperatures up to 820° centrigrade, will be avoided, just as it also will be possible to obtain gasification of the major part to the carbon contained in the refuse.

Hitherto for disposal of refuse by high-temperature gasification thereof, retorts have been used substantially of the same types as used for gasification of coal, i.e. retorts having an oblong, narrow cross-section. Per se such retorts are well suited for the destruction of refuse, but have, owing to the low specific weight of the refuse, a low capacity resulting in relatively high construction and working expenses.

It has been tried instead of retorts of the said types to use retorts having substantially larger sectional dimensions, such as is actually known from low-temperature gasification plants, and which should increase the capacity of each retort rather substantially, but such retorts have proved to be incapable for obtaining or maintaining the requisite high temperatures at the centre of the retort, as the refuse itself as well as the products occurring during the gasification are highly heat-insulating, one of the reasons being their contents of a high percentage of gas-filled cavities.

An object of the present invention is to provide a method as mentioned above, which renders it possible to use retorts of large sectional dimensions and accordingly having a large capacity, and still to obtain the requisite high temperature across the whole of the cross-section of the part of the retort, where the temperature is to be highest, and so that the total calorific value of the gas gained by each weight unit of refuse in any case is not smaller than that obtained in connection with the retorts hitherto used.

According to the present invention this is achieved thereby that a retort having gas exhaustion between the gasification zone and the ash outlet of the retort is used, and that a substantial quantity of the heat required for the destruction of the refuse in the retort is fed to the refuse in the form of steam superheated to a temperature exceeding 900°C, preferably exceeding 1200°C. Hereby is primarily obtained that the refuse is heated directly by the superheated steam, which is approximately evenly distributed in the retort so that within each cross-section of the retort the refuse is practically uniformly heated. Furthermore is obtained that the products formed at the beginning of the heating of the refuse through degasification thereof, and of which some are fats, as a result of the gas-exhaustion taking place after the gasification zone, are sucked through the latter and here affected by the high temperature, which together with the large excess of vapour, also serving as a gasification means, will have the effect of these substances as well as primarily formed carbon, such as for instance more complex compounds originating from plastics in the refuse, react with the vapour, substantially forming $CO$, $CO_2$, $H_2$, and $CH_4$. For this reason the use of the new method results in substantially more gas being produced from each weight unit refuse than obtainable by the indirect heating of the refuse hitherto used, and, at the same time, the amount of slag and ashes will be substantially reduced, and the slag and ashes will be practically free from carbon. While thus hitherto slag and ashes from refuse gasification plants have contained up to 40 percentage by weight of carbon, ashes and slag formed in connection with refuse destruction according to the invention will contain only a very small weight percentage of carbon. Certainly, the gas produced will have a very large content of vapour, but the major part thereof may be removed by condensation, through which very large quantities of heat may be regained, but even after the condensation of the vapour the quantity of gas will be substantially larger relative to the amount of refuse than hitherto achieved. It is true that the gas will be of a type having a somewhat smaller calorific value per normal cubic metre than gas from retorts heated from outside, but as a consequence of the large quantity produced, the total calorific value will be essentially higher, often more than twice the total calorific value of the gas obtained from the same refuse quantity in the retorts hitherto used. The gas is for instance excellently suitable for heating of the boiler, in which the superheated steam is produced. However, even if all the heat required for degasifying and gasification of the refuse is produced by the gas formed, there will still be a surplus of gas, which may be used by a district heating or power station attached to the refuse destruction plant. On the other hand, the gas obtained is less suitable for direct use as town gas, but may be rendered useful as such through carburetting or by being used as a thinner for gas produced in another way and having a high calorific value per normal cubic metre.

BRIEF DESCRIPTION OF THE DRAWING

The drawing is a schematic diagram of an embodiment of a refuse disposal system for carrying out a disposal method according to the present invention.

DESCRIPTION OF THE PREFERRED EMBODIMENT

The drawing provides a schematic illustration of a system for disposing of refuse. The refuse is fed from a source 17 to a preheater 18 where the refuse is heated to a temperature of between 500° and 700°C. The refuse is fed from the preheater 18 into a rotary retort 11 in which the refuse is heated to a sufficient temperature for degasification and gasification to occur. The refuse in the retort 11 is primarily heated by superheated steam which is supplied to the retort by superheated steam source 14. This source 14 supplies the superheated steam to the retort 11 in two locations, the first being in the area of the inlet of the retort and the second being in a position between the gasification zone and the inlet.

A steam source 19, located in a heating medium 12, supplies steam to the superheated steam source 14. The heating medium 12 is also connected to the superheated steam source 14 for providing a source of heat to the latter. A fireplace 13 supplies heat to the heating medium 12. The heating medium 12 additionally supplies heat to the walls of the retort so as to help maintain uniform heating within the retort.

After the refuse has been treated within the retort, the ashes which are produced are collected within the ash outlet 15 and the gases which are produced within the gas exhaust 16. A portion of the gases passing through the exhaust 16 can be recycled back into the fireplace for further burning.

It has proved to be most advantageous if the superheated steam passes through the retort co-current with the refuse, so that the refuse is heated intensely immediately it has come into the retort, whereby the degasification period will be relatively short, and the gasification period correspondingly longer, which is an advantage when the decomposition is to be as complete as possible.

However, the introduction of the superheated steam in the said manner may have the effect that too large a quantity of the heat contained in the steam is used for the degasification, and if too large a consumption of steam is to be avoided, therefore, for ensuring the requisite high temperature in the gasification zone it may at times be expedient that the superheated steam or a part thereof is fed into the retort between the gasification zone and the refuse inlet, whereby the refuse, immediately before or within the gasification zone itself, is exposed to a further heating, resulting in the maximum extent of and a high temperature in the gasification zone. Even if all the steam should be introduced near the gasification zone, part of it will, however, make its way towards the refuse inlet and provide for the supply of heat to the refuse required for the degasifying.

To ensure the most uniform heating of the refuse over each retort cross-section, it has proved to be most expedient that a retort is used having a substantially circular cross-section, whereas by the use of retorts having an oval or polygonal cross-section rather uneven temperature distributions may arise, reducing the capacity of the retort.

Gradually as the refuse moves through the retort, its volume will be reduced as a result of the destruction, and to ensure that the whole of the refuse is influenced by steam, it may be expedient that a retort is used, the internal cross-sectional area of which diminishes in direction from the refuse inlet towards the ash outlet.

In case within a retort the superheated steam is brought directly to affect the cold refuse just introduced, it may have the effect that the heating of the refuse will take place relatively slowly, in any case in the part of the retort being next to the inlet, for which reason this part will have to be particularly long, and further that the effect in the longitudinal direction of the retort, reckoned from the inlet, the rise in the temperature will in too high a degree be dependent on the water content of the refuse. Therefore, it may be expedient that the refuse is preheated to a temperature of between 500° and 700°C before it is influenced by the superheated steam, preferably before being fed into the retort, so that it is ensured that there is no free water in the refuse, when the refuse gets into contact with the superheated steam, that the latter will not be condensed by the refuse, and that the refuse when reaching the active part of the retort invariably will have about the same temperature, so that a fairly even temperature rise can be ensured under all conditions in connection with the movement of the refuse through the retort.

The said preheating of the refuse may be carried through in a special preheating chamber of the retort, but most expediently it is performed in a special inlet to the retort. Provided this preheating takes place in an upwards open refuse feed shaft, the latter will work as a lead-in sluice for the refuse since in the shaft the steam formed by the preheating will provide a little below the free surface of the refuse, provided this does not sink below a certain level, a pocket of saturated steam, which on the top is limited by a thin layer of water, which together with the steam pocket will have the effect of driving the gases contained in the refuse out above the refuse, so that the refuse is fed into the retort with the slightest possible content of air.

Even though by the new method as an essential part of the amount of heat required for the heating of the refuse has to be fed to the refuse in the form of superheated steam, it may, however, be an advantage that the retort wall or a part thereof is simultaneously directly heated. This direct heating, which in particular is of importance to the parts of the retort, which in direction with the inlet are at a distance from the retort zone with maximum temperature, has the effect that along the wall of the retort no circumferential zones are formed having a temperature substantially lower than that obtained in the centre of the retort, and, at the same time, the said external heating ensures that the steam regains part of the heat previously given off to the refuse, which again has the effect that the length of the retort may be rendered as short as possible with consideration to the necessary decomposition times at the temperatures obtained. The heating from outside may be obtained by means of a heating medium flowing through ducts in or surrounding the retort wall. Provided further the heating medium is conducted in counterflow with the refuse over a section between the refuse inlet and the part of the gasification zone next to the gas outlet, the external wall will get the highest temperature there where the steam is to have the highest temperature.

Most appropriate as heating medium there is used combustion products from the steam generating device, so that no special heating apparatus is required.

Normally the refuse ought to be fed into the retort with a minimum of atmospheric air contained therein, but in spite hereof, frequently it may be advantageous simultaneously with the superheated steam to introduce preferably preheated gasification means other than steam, such as for example carbon dioxide, atmospheric air or enriched air. As a rule it will only be a question of feeding atmosphere air, since the adding of other gasification means, which may mean an essential advantage, for economic reasons will depend upon whether there are activities in the vicinity of the refuse destruction plant, which produce such gasification means as a kind of refuse products, which without charge or against a small payment can be placed at the disposal of the refuse destruction plant. Adding atmospheric air along with the steam will have the effect that the total amount of air introduced into the retort can be kept under close control and adapted to requirements, which is not the case if large quantities of atmospheric air are allowed to be introduced along with the refuse itself.

As appears from the above, for obtaining a satisfactory result it is necessary that the superheated steam is able to contact the degassed, carbonaceous refuse. To ensure this it may be expedient to use a retort having a rotatable retort wall, which continuously or discontinuously is brought to rotate during the gasification of the refuse. Such a rotation of the retort wall will have the effect that, besides the movement of the refuse material through the retort in its longitudinal direction, transverse movements of the material are produced, whereby it is prevented that obstructions, which are impervious to the steam, and ducts, which much too easily may be penetrated by the steam, are formed, and simultaneously ash formed is shaken away from the surface of the refuse, so that this may all the time participate in the gasification process, and the amount of free carbon in the ashes or the slags is thereby further reduced.

If a vertical retort having a rotatable retort wall is used, the pile of refuse material resting on the bottom of the retort or rather on the layer of ashes and slag will have its outer portions bearing against the walls of the retort withdrawn in the rotation of the retort wall, so that the pile is exposed to a torsional stress causing the shaking of the material aimed at. In this case the strongest effect will usually be achieved, if the rotation of the retort wall is discontinuous, so that the formation of a slide layer between the refuse material and the retort wall is avoided, which otherwise might reduce the ability of the retort wall to withdraw the refuse material in its rotation.

Most expedient it is, however, is case a retort is used having a rotatable retort wall, the axis of which is horizontal or extends oblique downwards in the flow direction of the refuse, i.e. to use a retort, which on the whole corresponds to a rotary kiln. In such a retort it is possible to obtain a perfectly uniform heating of the material and a most effective removal of the ashes from the free surfaces of material, so that a maximum destruction of the refuse is achieved.

In this case it is to be preferred that the feeding of the refuse into the retort and the removal of ashes from the retort is adjusted in such a manner that the outlet end of the retort is maintained completely filled with partly or completely destroyed refuse, so that there is no free connection between the gasification zone and the gas outlet, whereby it is prevented that larger quantities of steam pass through the retort without substantially contributing to the heating of the refuse and the gasification, and that soot and tarry particles carried away with the gas and other substances formed during the degasifying and gasification processes, but not yet converted into gas, are retained by the material filling the retort, so that these substances get time to react with the vapour and other gasification means added, if any, and the gas leaving the retort is free from impurities, which are difficult to remove.

The relatively large quantities of steam required for the heating of the refuse and being in substantial excess compared with the quantities of steam serving only as gasification means, leave the retort along with the gas, wherefore, for heat economic reasons, it is still more necessary than in the case of the known refuse gasification methods to ensure that the gas, after having left the retort, preferably after solid impurities such as ashes particles have been removed from the gas, for instance in a cyclone, is conducted through heat exchangers and then through a condenser for condensation of the major part of the vapour existing in the gas, whereby a very great part of the heat used for the generation and superheating of the steam can be regained and utilized for preheating of refuse, gas combustion air for the fire of the steam boiler, air or other gasification means for the retort, and feed water for the steam boiler.

The condensed water may, if need be, be used as feed water for the boiler after removal of suspended ashes, dissolved salts and dissolved gases.

However, for heat economic reasons, it may often be expedient to recirculate part of the hot vaporous gas to the retort.

After the vapours having been condensed by the gas, this may, for removal of any in preceding plant parts not yet removed substances, such as ashes, ammonia, hydrogen chloride, hydrogen sulphide, and other gases, be conducted to a venturi scrubber, where it is washed with water.

From the venturi scrubber the gas can be conducted to a gas-holder or a like gas accumulator and from there to consumption, for instance to the boiler producing the steam. The water from the venturi scrubber will after sedimenting of ashes contain for instance hydrogen chloride, hydrogen sulphide, ammonia, ammonium chloride, and ammonium sulphide in so poor a concentration that, from the point of view of contamination, it is harmless. Further, before discharge into the sewer, the free acids may even be neutralized by lime milk.

In this connection it should be mentioned that the gas volume from a plant to carry through the new method will be far smaller and accordingly more economical and easy to cleanse effectively than the flue gas volume from an incinerator, in which the combustion air is in direct contact with the refuse, so that the flue gas has a large content of nitrogen, which will load a cleansing plant for the flue gas.

Up to the priority date of the present patent, experiments on a grand scale with the new method have not been practicable without the danger of open use, but the practicability of the method has been tested in more primitive experimental plants, where, however, it was not possible to carry out heat economy analyses.

The gasification under the presence of the very large quantities of preheated vapour has the greatest interest in regard to the practical utilization of the new method, and, among others, this is based upon and supported by laboratory gasification experiments, in which as refuse rubbish from a mainly inhabited town area was used, which rubbish was disintegrated and carefully mixed.

The gasification was undertaken in a rotating 1000 mm long Pythagorean tube, carried through another electrically heated 600 mm long stationary Pythagorean tube, and to which by means of a worm gear with adjustable numbers of revolutions refuse was continuously fed, and through a steam tube, closed at the end but provided with side openings and extending into the rotating Pythagorean tube, steam was fed coming from a laboratory steam generator and superheated to about 400°C. The bottom end of the rotating Pythagorean tube opened into an ashpit, from which the gas could be sucked up, and after condensation in a condenser cooled by means of cold water conducted to a gas-metre. The ashpit was so designed that it was possible to introduce a Ni-CrNi thermo element housed in a quartz tube for measuring the temperature over the greatest part of the length of the rotating Pythagorean tube.

In the case of an experiment, chosen by way of an example, the rotating Pythagorean tube was heated to about 1050°C, and immediately after the end of the steam tube the steam was thereby superheated to 1050°C, which temperature, as a consequence of the steady supply of heat through the walls of the rotating Pythagorean tube, was maintained up to about 300 mm from the end of the rotating Pythagorean tube.

When the working conditions had been stabilized after some hours, analyses were made, which gave the following results:

Destroyed quantity of rubbish per hour: — 0.5 kilo
Produced gas liberated for vapour through condensing thereof: — 0.4 normal cubic metre
Composition of the gas in volume percentages:
$H_2$ — 50 per cent.
$CH_4$ — 5 per cent.
$CO$ — 24 per cent.
$CO_2$ — 18 per cent.
$C_2H_4$ — 3 per cent.
The upper calorific value of the gas ($H_s$): — 3.200 kcal/normal cubic metres
The lower calorific value of the gas ($H_i$): — 2.900 kcal/normal cubic metres
Ashes: White with no measureable carbon content.

What we claim is:

1. A method for disposal of refuse by degasification and gasification thereof in a retort to convert the refuse into gases and ash products, the retort having an inlet for feeding the refuse into the retort and an outlet for the ash products and for exhausting the gases from the retort, comprising the steps of continuously moving the refuse through the retort; continuously introducing superheated steam at a temperature of at least 900°C into the refuse in the area of the inlet to heat the refuse within the retort and in such amount that, within the retort, the refuse is degasified and is then gasified in a zone; and maintaining a temperature of at least 900°C in said zone.

2. A method as set forth in claim 1 wherein the superheated steam introduced in the retort has a temperature which exceeds 1200°C.

3. A method as defined in claim 1, wherein the superheated steam is additionally introduced into the retort between said zone and said inlet.

4. A method as defined in claim 1 further comprising the step of preheating the refuse to a temperature of between 500°C and 700°C prior to the step of heating the refuse by the superheated steam.

5. A method as defined in claim 4 wherein the step of preheating the refuse takes place prior to the refuse being fed into the retort through the inlet thereof.

6. The method as defined in claim 1, further comprising the step of heating the retort along at least parts of the walls thereof to indirectly heat the refuse within the retort and supplement the heating of the refuse being heated by the superheated steam.

7. The method as defined in claim 6 wherein the heating of the walls of the retort is accomplished by passing a heating medium in a counter flow with respect to the refuse and over a section of the retort disposed between the inlet of the retort and a portion of the gasification zone next to the outlet of the retort.

8. A method according to claim 6 further comprising the step of producing the superheated steam in a steam generating plant having a steam generator which is heated by flue gases from a fireplace utilizing the gases produced by the gasification of the refuse and the flue gases from the steam generating plant are used as the heating medium.

9. A method as defined in claim 1 further comprising the step of also introducing into the retort, simultaneously with the introduction of the superheated steam, additional gasification agents selected from a group consisting of carbon dioxide, atmospheric air and enriched air.

10. A method as defined in claim 1, further comprising the step of rotating the walls of the retort about the longitudinal axis of the retort during the gasification of the refuse.

11. A method as defined in claim 10 further comprising the step of feeding the refuse into the retort at such a rate and removing the ash products from the retort at such a rate that the outlet end of the retort is maintained completely filled with partially or completely converted refuse.

12. A method as defined in claim 1 wherein the heating of the refuse by the superheated steam produces gaseous products which include fuel gases and further comprising the step of recovering the gaseous products.

* * * * *